United States Patent
Hoshino

(10) Patent No.: US 6,636,620 B1
(45) Date of Patent: Oct. 21, 2003

(54) PERSONAL IDENTIFICATION AUTHENTICATING WITH FINGERPRINT IDENTIFICATION

(75) Inventor: Satoshi Hoshino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/200,981

(22) Filed: Nov. 30, 1998

(30) Foreign Application Priority Data

Nov. 28, 1997 (JP) .............................................. 9-328546

(51) Int. Cl.[7] .................................................. G06K 9/00
(52) U.S. Cl. ...................................... 382/124; 340/5.53
(58) Field of Search ................................. 382/115, 124, 382/125; 235/380, 492; 704/246, 273; 902/3, 4, 25; 340/825.3, 825.34; 283/68; 356/71; 705/1, 26, 42

(56) References Cited

U.S. PATENT DOCUMENTS

| | | | |
|---|---|---|---|
| 4,944,021 A | | 7/1990 | Hoshino et al. ............... 382/5 |
| 4,993,068 A | | 2/1991 | Piosenka et al. ............ 713/186 |
| 5,128,523 A | | 7/1992 | Diehl et al. ................. 235/441 |
| 5,446,290 A | | 8/1995 | Fujieda et al. .............. 250/556 |
| 5,623,552 A | * | 4/1997 | Lane .......................... 382/124 |
| 5,635,723 A | | 6/1997 | Fujieda et al. .............. 250/556 |
| 5,708,497 A | | 1/1998 | Fujieda ........................ 356/71 |
| 6,016,476 A | * | 1/2000 | Maes et al. .................... 705/1 |

FOREIGN PATENT DOCUMENTS

| | | |
|---|---|---|
| CN | 2201059 | 6/1995 |
| EP | 0 379 333 | 7/1990 |
| JP | 63-288365 | 11/1988 |
| JP | 1-154295 | 6/1989 |
| JP | 6-325158 | 11/1994 |
| JP | 8-180173 | 7/1996 |
| JP | 9-116128 | 5/1997 |
| WO | WO 94/10659 | 5/1994 |

* cited by examiner

Primary Examiner—Samir Ahmed
(74) Attorney, Agent, or Firm—Foley & Lardner

(57) ABSTRACT

A personal identification authenticating system for a client terminal in communication with a server. The server includes a computer and a database. The server performs a service whose uses are limited. The client terminal plays a role of an IC card authorizing device, while the server plays a role of an approval center. The database stores personal information of the service users. The stored personal information on the database includes information related to fingerprints and ID numbers of the service users. A client terminal user impresses one's fingerprint on a fingerprint sensor and puts one's IC card into a card reader. The IC card stores personal information of a card owner. The stored personal information on the IC card includes information related to a fingerprint and an ID number of the card owner. The client terminal includes an authenticator, which provides an authenticating signal if the sensed fingerprint information of the client terminal user matches stored fingerprint information of the card owner. The client terminal transmits the stored personal information of the card owner to the, server upon occurrence of the authenticating signal which transmits an authorizing signal to the client terminal if the transmitted personal information of the card owner matches the stored personal information on the database. Upon receiving the authorizing signal, the client terminal user is authorized to access into the computer of the server.

8 Claims, 5 Drawing Sheets

PERSONAL IDENTIFICATION AUTHENTICATING WITH FINGERPRINT IDENTIFICATION

FIELD OF THE INVENTION

The present invention relates to a system for authenticating personal identification and more particularly to a personal identification authenticating system for a client terminal in communication with a server.

BACKGROUND OF THE INVENTION

Proving one's identify is necessary when accessing a computer whose users are limited. In order to prevent individuals other than the registered users from accessing the computer, a password or a personal identification number is issued with each ID card. Access to the computer is enabled only when both a password and an ID number corresponding to the user's number read from the ID card is entered through the keyboard.

Transaction execution systems which enable the performance of transactions, such as cash issuance at terminals remote from and in communication with a host data processing system having a central database in which account and other information is stored, are well known.

Such systems, which are frequently used by banks to extend their services, permit the issuance of cash or the receipt of deposits through a terminal, for example, an automatic teller machine (ATM). Such a terminal typically includes a mechanism for receiving and reading information from a card, a user input such as a keyboard, a display and document entry and exit apertures. Issuing a personal ID number with each credit card attains increased security for the issuance of cash or other banking transactions without intervention of a bank employee. A credit card transaction is then enabled only when an ID number corresponding to the account number read from the credit card is entered through the keyboard. This required correspondence prevents a thief or mere finder of a credit card from receiving cash, for example, from a terminal. Upon entry by a terminal user or a customer of a credit card and personal identification number, the terminal is instructed to communicate the credit card data and the personal identification number to the host for authorization of the transaction. At the host, a database of identification numbers is accessed by the card data. The identification number obtained from the database is compared with the personal identification number received from the terminal to perform a host PIN check.

When ID cards, credit cards or other cards are stolen, passwords and/or ID numbers read from cards are .decrypted. Thus, presenting a password or a personal identification number with a card is woefully inadequate in preventing individuals other than the registered users from accessing the computer.

It is known to use fingerprints in conjunction with an identification card to verify ownership of the card. JP-A 63-288365 discloses an ATM wherein a selector button to be pressed by a customer for transaction is transparent. A fingerprint of the customer impressed on this transparent button is recorded using an optical system including a video camera. The recorded fingerprint information is compared with stored fingerprint information.

JP-A 1-154296 discloses an ATM wherein a selector button, such as a yen key, is provided with a fingerprint pickup head of an optical fingerprint recording system.

Various compact fingerprint sensors are disclosed by U.S. Pat. No. 5,446,290 (issued on Aug. 29, 1995) that is considered to correspond to JP-A 6-325158, U.S. Pat. No. 5,635,723 (issued on Jun. 3, 1997) that is considered to correspond to JP-A 8-380173, and U.S. Pat. No. 5,708,497 (issued on Jan. 13, 1998) that is considered to correspond to JP-A 9-136328.

In transaction execution systems, a transaction terminal is designed for maximum likelihood that the user of the terminal can perform the transaction in an error free manner even if the user has never operated the terminal before. Such a terminal typically includes a group of selector buttons which allow the customer to perform the transactions and a keypad which may be used by the customer to enter money amounts. Thus, the selector or key switches or buttons of the terminal do not exceed a certain number in the neighborhood of 40. The transaction terminal may include a supply of cash and a cash dispensing mechanism and may also include a depository for receiving customer deposits. These components would then be located within the security chest. In addition, the main control electronics for the terminal may also be located within the security chest so as to prevent any unauthorized access to the control electronics. In addition to the components of the terminal system located within the security chest, a number of components may be located outside the security chest. Thus, the terminal is not compact. In the transaction execution systems, a highly reliable communication means such as an exclusive line is used to establish communication between each terminal with the host data processing system.

In a local area network (LAN) or a wide area network (WAN), personal computers and workstations are used as terminals. Internet system with great number of servers and clients allows the use of desktop or hand-held terminals. A keyboard of such a terminal includes a great number of key or selector switches that amount in number to approximately 300. In the internet systems, each server may perform an exclusive service for a group of authorized users and also may perform an open service whose users are unlimited. Communication means used to connect each terminal to such a server is not highly reliable.

It would therefore be desirable to provide a personal identification authenticating system for use in a terminal that can request both an exclusive service and an open service to a server. The exclusive service requires authentication of personal identification of the terminal user before access to a computer of the server although the free service requires password only from the terminal user.

An object of the present invention is to provide a small-sized personal identification authenticating system for preventing unauthorized individuals from accessing a computer.

SUMMARY OF THE INVENTION

According to one aspect of the present invention, there is provided a system for authenticating personal identification, comprising:

a server including a computer whose users are limited, said server having a database storing information related to ID numbers assigned to said users and information related to fingerprints of said users;

an IC card storing personal information including information related to an ID number of the card owner and information related to a fingerprint of the card owner;

a client terminal in communication with said server, said client terminal including a card reader for reading the stored personal information on said IC card, and a fingerprint sensor for sensing a fingerprint of the client terminal user;

an authenticator that compares the sensed fingerprint information of the client terminal user with the stored fingerprint information of the card owner and produces an authentication signal if the sensed fingerprint information matches the stored fingerprint information;

a transmitter that transmits personal information including the sensed fingerprint information and the authentication signal to said server if the authentication signal is produced; and an authorizer that compares the transmitted personal information of the card owner with the stored personal information on the database and produces an authorization signal if the transmitted personal information matches the lo stored information on the database, thereby to give the client terminal user an access to said computer of said server.

According to another aspect of the present invention, there is provided a method of authenticating personal identification for a client terminal in communication with a server that includes a computer and a database, the method comprising the steps of:

storing into the database information related to identification numbers and fingerprints of users who are allowed to access into the computer of the server;

storing into an IC card information related to an identification number and a fingerprint of each of the users;

presenting descriptive screen to a client terminal user to give instructions to the client terminal user;

sensing a fingerprint of the client terminal user;

reading the stored information on the IC card;

comparing the sensed fingerprint information with the stored fingerprint information of the card owner;

transmitting the sensed fingerprint information of the client terminal user and the stored information of the card owner to the server from the client terminal if the sensed fingerprint information matches the stored fingerprint information of the card owner;

comparing the transmitted information with the stored information on the database; and authorizing the client terminal use to access into the computer if the transmitted information matches the stored information on the database.

DESCRIPTION OF THE PREFERRED EMBODIMENTS

The present invention will now be described more fully hereinafter with reference to the accompanying drawings, in which preferred embodiments of the invention are shown. The terms "server," "client terminal," and "integrated circuit (IC) card" are used throughout the specification. The term "server" is meant to include a data processing system that performs a service for clients. The term "client terminal" is meant to include a terminal that requests services of a server. The term "IC card" is used to mean cards that can store personal information including information related to a fingerprint of the card owner, and is meant to include cards whose purpose is purely identification, and diverse other cards used for additional purposes as well.

Figure 1:
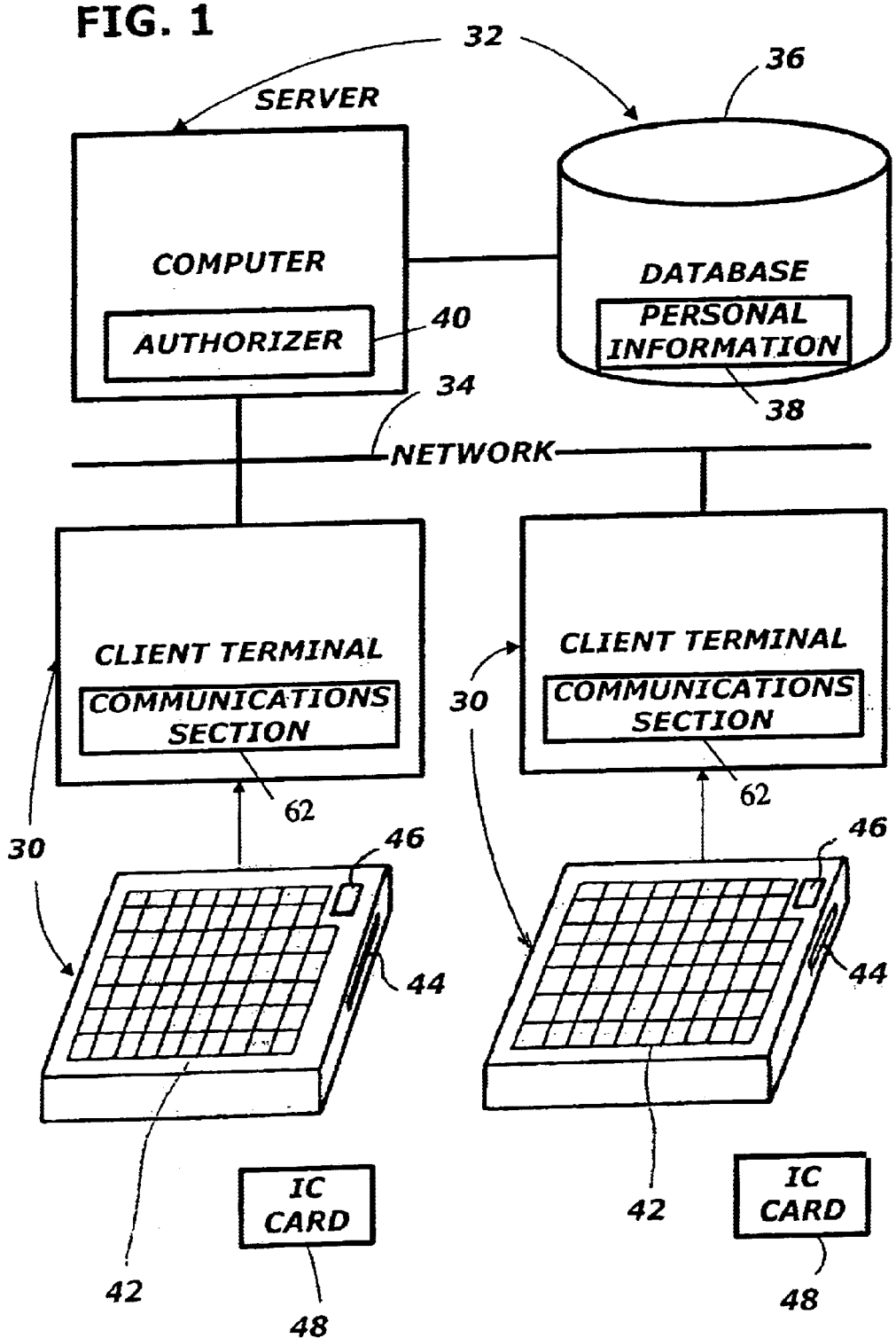
FIG. 1 illustrates client terminals in communication with a server incorporating a personal identification authenticating system according to the present invention.

Referring to FIG. 1, the personal identification authenticating system is designed to authenticate identification of a user of each client terminal 30. The client terminals 30 are in communication with a server 32 through a network 34. The server 32 includes a computer. In this embodiment, the server 32 can perform both an exclusive service whose users are limited and an open service whose users are unlimited although it may perform an exclusive service only.

The server 32 includes a database 36 storing personal information 38. The personal information 38 includes information related to ID numbers and fingerprints of users authorized to access the computer of the server 32. The server 32 also includes an authorizer 40, which compares personal information transmitted from a client terminal 30 with the stored personal information 38 on the database 36. The authorizer 40 transmits an authorization signal to the client terminal 30 if the transmitted personal information matches the stored personal information 38 on the database 36.

Figure 3:
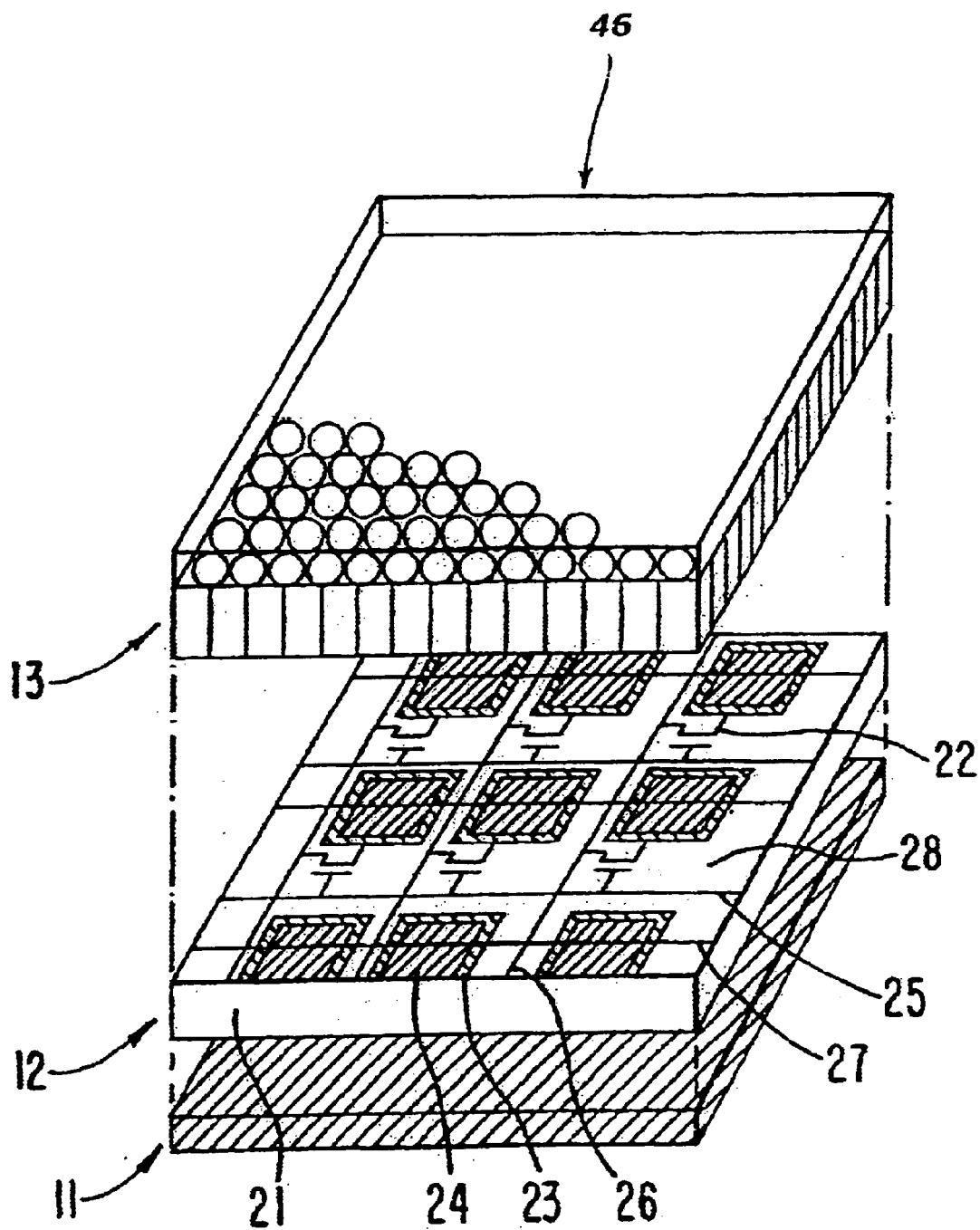
FIG. 3 is a perspective view partially broken away of a fingerprint sensor.

Each client terminal 30 includes a user input device in the form of a keyboard 42, an IC card reader 44, and a fingerprint sensor, preferably in the form of a semiconductor fingerprint sensor 46 (see FIG. 3). It also includes a communications section 62 for transmitting and receiving information to and from the server 32. The fingerprint sensor may sense information related to a fingerprint using a multiple of small capacitors to detect the ridges and valleys of a fingerprint. A client terminal user puts an IC card 48 into a slot of the IC card reader 44. Each IC card 48 stores personal information of the card owner. The stored personal information includes information related to an ID number of the card owner and information related to a fingerprint of the card owner. It is preferred that the fingerprint information be encrypted.

Figure 2:
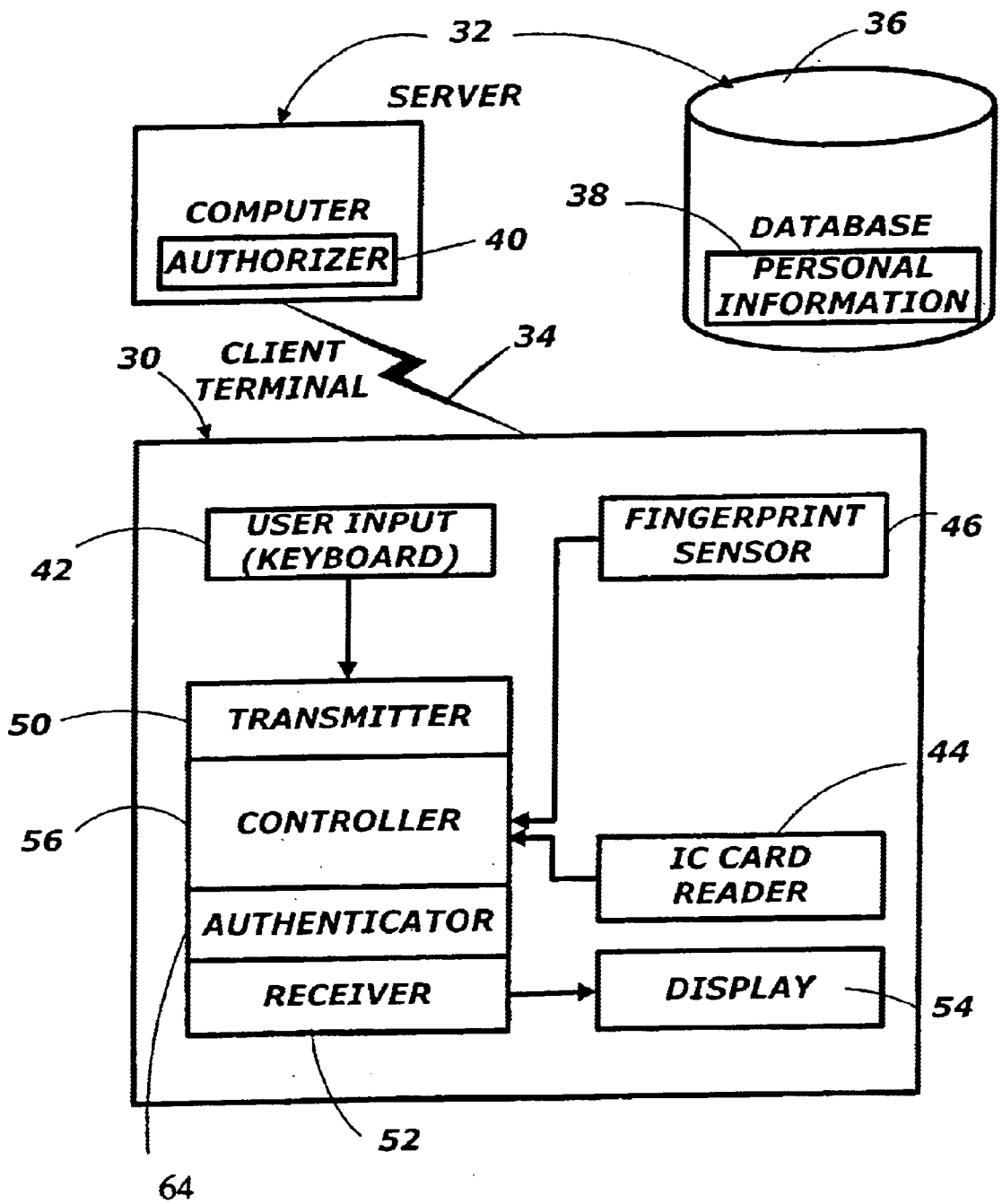
FIG. 2 is a block diagram of the terminal.

The client terminal 30 as illustrated in FIG. 2 carries an authenticator 64 in addition to the IC card reader 44 and the fingerprint sensor 46. The authenticator 64 is electrically connected to the finger print sensor 46 and the IC card reader 44. It compares information related to a sensed fingerprint with the stored fingerprint information on the IC card 48 and produces an authentication signal if the sensed fingerprint information matches the stored fingerprint information. A transmitter 50 is electrically connected to the IC card reader 44 and the fingerprint sensor 46 for transmitting the sensed fingerprint information, the personal information read by the IC card reader 44 and the authenticating signal to the server 32 only if the authenticating signal has been produced. A receiver 52, for receiving an authorization signal from the server 32, and a display 54, for indicating that a client terminal user has been approved for accessing the computer of the server 32, are preferably included in the client terminal 30. The keyboard 42 is used by the terminal user for entering information. The transmitter 50 is rendered responsive to the keyboard 42 for transmitting information entered by the keyboard 42 to the computer of the server 32 upon or after receipt of the authorizing signal from the server 32. A controller 56 controls operations of the client terminal 30.

The server 32 includes an access approval mechanism for receiving the personal information including the sensed fingerprint information along with the authenticating signal to compare this personal information with the stored personal information 38 from the database 36 and for approving access to the computer of the server 32. Specifically, the authorizer 40 transmits an authorizing signal to the client terminal 30 if the personal information transmitted from the client terminal matches the stored personal information 38 on the database 36. The authorizer 40 may transmit its signals over the network 34.

Referring now to FIG. 3, the fingerprint sensor 46 of FIGS. 1 and 2 will be described. The fingerprint sensor 46 of the illustrated type is disclosed in U.S. Pat. No. 5,446,290 issued on Aug. 29, 1995 to Fujieda et al., the disclosure of which is incorporated in its entirety herein by reference. Briefly explaining, the fingerprint sensor 46 includes a planar light source 11, a two-dimensional image sensor 12, and optical element 13. The two-dimensional image sensor 12 includes a great number of photosensitive elements 24 arranged two-dimensionally on a transparent substrate 21. Each photosensitive element 24 is formed on a light shielding plate 23 and connected to a terminal of a signal reading switch 22 in the form of a polycrystalline silicon thin film transistor (TFT). The switch 22 is further connected to a signal reading line 26 and a switching line 25. The photosensitive elements 24 arranged along the switching line are connected to a bias applying line 27. An opening 28 is provided in an area unoccupied by the lines 25, 26 and 27 and the light shielding plates 23.

Figure 4:
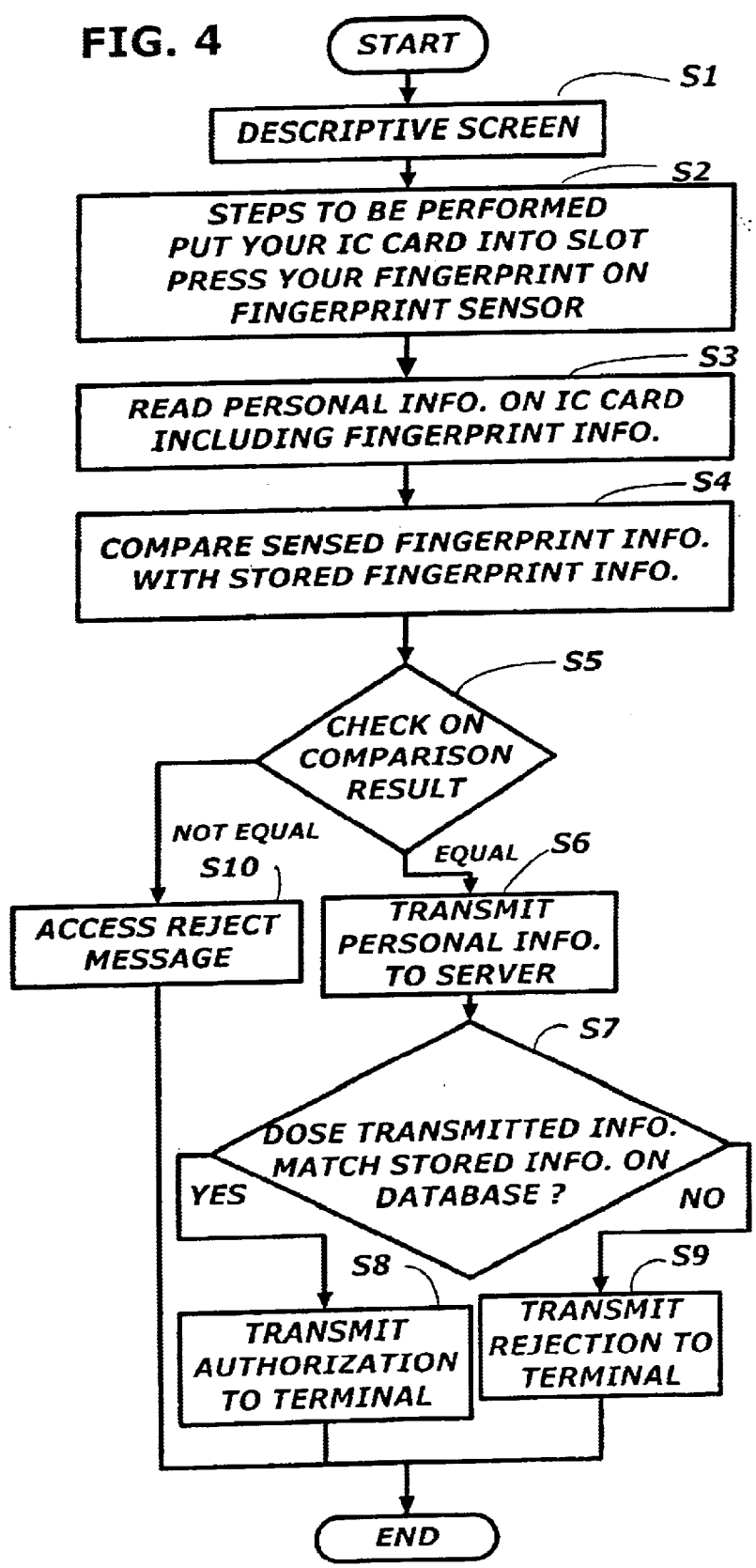
FIG. 4 is a flow chart illustrating a method of authenticating personal identification.

A preferred method of authenticating personal identification is illustrated by the flow chart of FIG. 4. After activation of a client terminal 30, a descriptive screen is presented or shown by step S1. This screen offers a client terminal user instructions to put an IC card 48 into a slot of an IC card reader 44 and place a fingerprint on a fingerprint sensor 46. In accordance with the instructions on the descriptive screen, the user puts an IC card 48 into the slot of the IC card reader 44 and places a fingerprint on the fingerprint sensor 46 by step S2. Information related to the fingerprint is sensed and the stored personal information is read by step S3. The sensed fingerprint information is compared with the stored fingerprint information by step S4 to determine if there is a match. The comparison result is checked by step S5. If there is a match, the sensed fingerprint information by the fingerprint sensor 46 and the stored personal information read by the IC card reader 44 are transmitted from the terminal 30 to a server 32 long with an authenticating signal by step S6. At the server 32, the transmitted personal information including the sensed fingerprint information is compared with the stored personal information 38 on a database 36 by step S7. If the transmitted information by the client terminal 30 matches the stored information on the database 36, an authorization signal is transmitted to the client terminal 30 by step S8. If there is no match, a rejection signal or no signal is transmitted to the client terminal 30 by step S9. If, at step S5, there is no match between the sensed fingerprint information and the stored fingerprint information, an access reject message is presented or shown by step S10. In this case, the information will not be transmitted from the client terminal 30 to the server 32. This reduces load carried by the server 32 and the network 34.

From the preceding description, it is noted that the sensed fingerprint information, which has been compared with the stored fingerprint information, is transmitted to the server 34 along with the authenticating signal for comparison with the stored information 38 on the database 36. This authenticates personal identification of a client terminal user with a high degree of accuracy and security even if the network 34 is not highly trustworthy.

Figure 5:
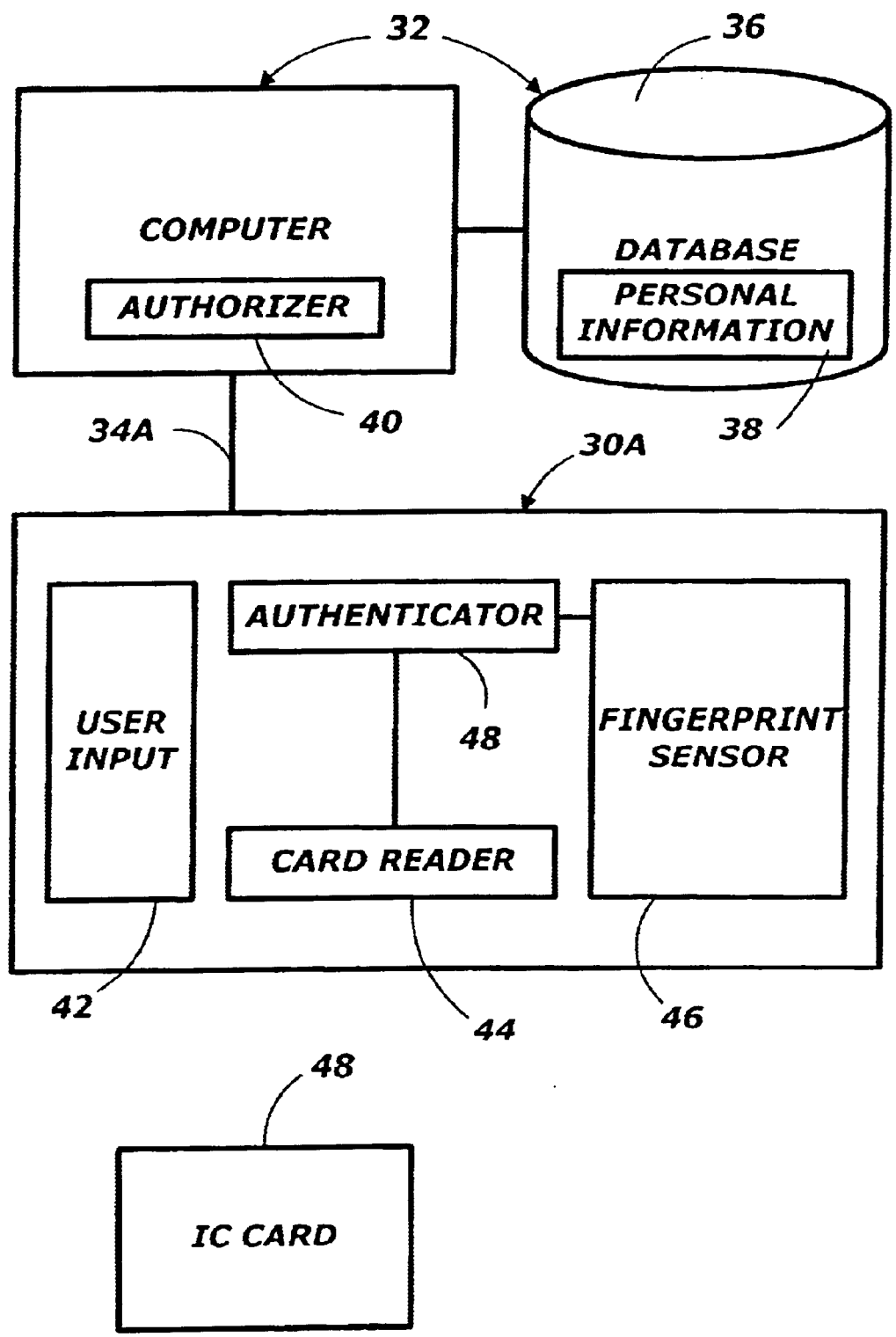
FIG. 5 illustrates a terminal and a server, in the form of a single computer incorporating the personal identification authenticating system according to the present invention.

FIG. 5 illustrates a terminal 30A connected a server in the form of a single computer 32 by a highly reliable communication line 34A. The same reference numerals as used in FIGS. 1 and 2 are used in FIG. 5 to designate like or similar parts. The system illustrated FIG. 5 may incorporate the personal identification authenticating system thus far described without any substantial modification.

If communications between client terminals and each server are highly reliable and trustworthy like the one illustrated in FIG. 5, the sensed fingerprint information may be transmitted directly to the server for comparison with stored data on a database of the server.

If client terminal users are authenticated with a high degree of accuracy and security, a server is enabled to perform such exclusive services as application software logon, encryption of application data, decryption of data with encrypted key and electronic signature and its verification with a high degree of security.

Once one is authorized as a user of an exclusive service performed by a server that performs various other open services, this user may request such services to this server through any one of client terminals that have incorporated the personal identification authenticating system according to the present invention.

What is claimed is:

1. A system for authenticating personal identification, comprising:

a server including a computer whose users are limited, said server having a database storing information related to ID numbers assigned to said users and information related to fingerprints of said users;

an IC card storing personal information including information related to an ID number of the card owner and information related to a fingerprint of the card owner;

a client terminal in communication with said server, said client terminal including a card reader for reading the stored personal information on said IC card, and a fingerprint sensor for sensing a fingerprint of the client terminal user;

said client terminal comprising:

an authenticator that compares the sensed fingerprint information of the client terminal user with the stored fingerprint information of the card owner and produces an authentication signal if the sensed fingerprint information matches the stored fingerprint information; and a transmitter that transmits personal information including the sensed fingerprint information and the authentication signal to said server only if the authentication signal is produced by the authenticator; and said server comprising:

an authorizer that compares the transmitted personal information of the card owner with the stored personal information on the database and produces an authorization signal if the transmitted personal information matches the stored information on the database, thereby to give the client terminal user an access to said computer of said servers wherein said server does not receive any information from the client terminal if the authenticator determines that the sensed fingerprint information of the client terminal user does not match with the stored fingerprint information of the card owner.

2. The system as claimed in claim 1, wherein said server performs both an exclusive service whose users are limited and an open service whose users are unlimited.

3. The system as claimed in claim 1, wherein the stored fingerprint information on the IC card is encrypted.

4. The system as claimed in claim 1, wherein said fingerprint sensor is a semiconductor fingerprint sensor.

5. A method of authenticating personal identification for a client terminal in communication with a server that includes a computer and a database, the method comprising the steps of:

storing into the database information related to identification numbers and fingerprints of users who are allowed to access into the computer of the server;

storing into an IC card information related to an identification number and a fingerprint of each of the users;

presenting descriptive screen to a client terminal user to give instructions to the client terminal user;

sensing a fingerprint of the client terminal user;

reading the stored information on the IC card;

comparing the sensed fingerprint information with the stored fingerprint information of the card owner;

transmitting the sensed fingerprint information of the client terminal and the stored information of the card owner to the server from the client terminal only if the sensed fingerprint information matches the stored fingerprint information of the card owner;

comparing the transmitted information with the stored information on the database; and authorizing the client terminal user to access into the computer if the transmitted information matches the stored information on the database.

6. The method as claimed in claim 5, further comprising the step of:

presenting access reject message to the client terminal user if the sensed fingerprint information fails to match the stored fingerprint information of the card owner.

7. The method as claimed in claim 5, wherein the server performs both an exclusive service whose users are limited and an open service whose users are unlimited.

8. The system as claimed in claim 1, further comprising a network that communicatively connects the server and the client terminal, wherein traffic over the network is minimized by data only being sent from the client terminal to the server if the authenticator produces the authentication signal.

* * * * *

UNITED STATES PATENT AND TRADEMARK OFFICE
CERTIFICATE OF CORRECTION

PATENT NO.     : 6,636,620 B1
DATED          : October 21, 2003
INVENTOR(S)    : Satoshi Hoshino It is certified that error appears in the above-identified patent and that said Letters Patent is hereby corrected as shown below:

<u>Title page,</u>
Item [*] Notice, please correct to read as follows:

-- [*] Notice: Subject to any disclaimer, the term of this patent is extended or adjusted under 35 U.S.C. 154 (b) by 480 days. --

Signed and Sealed this

Ninth Day of December, 2003

JAMES E. ROGAN
*Director of the United States Patent and Trademark Office*